United States Patent
Hess et al.

(10) Patent No.: US 9,079,261 B2
(45) Date of Patent: Jul. 14, 2015

(54) DETECTING A RELATIVE SHAFT POSITION ON GEARED SHAFTS

(75) Inventors: Gary L. Hess, Enfield, CT (US); James A. Gosse, Storrs, CT (US); Paul J. Leblanc, Thomaston, CT (US); James Saloio, Ludlow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 593 days.

(21) Appl. No.: 13/462,421

(22) Filed: May 2, 2012

(65) Prior Publication Data

US 2013/0291672 A1 Nov. 7, 2013

(51) Int. Cl.
*G06F 19/00* (2011.01)
*B23F 15/04* (2006.01)
*B23F 17/00* (2006.01)
*G01D 5/245* (2006.01)

(52) U.S. Cl.
CPC ............... *B23F 15/04* (2013.01); *B23F 17/001* (2013.01); *G01D 5/245* (2013.01)

(58) Field of Classification Search
CPC ... G01D 5/145; G01D 5/2451; G01D 5/2457; G01D 5/36; G01D 5/245; C03B 9/40; A01D 67/005; F02P 7/0675; G01M 15/06; G01P 3/4802; G01P 3/486; B23F 15/04; B23F 17/001
USPC .................. 702/46, 78, 79, 145, 150; 65/158; 73/114.26; 74/412 R; 250/231.16
See application file for complete search history.

(56) References Cited

U.S. PATENT DOCUMENTS

| 3,814,934 A | 6/1974 | Mesh et al. |
| 3,957,477 A * | 5/1976 | Jones et al. ..................... 65/158 |
| 4,553,426 A | 11/1985 | Capurka |

FOREIGN PATENT DOCUMENTS

| EP | 1063097 A1 | 12/2000 |
| EP | 1445173 A2 | 8/2004 |

OTHER PUBLICATIONS

European Search Report for corresponding EP Application No. 13157506, dated Dec. 18, 2013, pp. 1-8.

* cited by examiner

*Primary Examiner* — John H Le
(74) *Attorney, Agent, or Firm* — Cantor Colburn LLP

(57) ABSTRACT

A system for determining a relative position of a secondary gear includes a gear assembly including a phonic wheel fixed to a primary gear and a secondary gear rotatably engaged to the first gear, a sensor configured to output a signal upon detecting a tooth of the phonic wheel, and a digital logic circuit configured to detect a revolution of the phonic wheel, to generate a primary gear tooth pulse at intervals corresponding to intervals of teeth of the primary gear based on the detected revolution of the phonic wheel, and to generate a secondary gear revolution signal at an interval corresponding to a revolution of the secondary gear based on the primary gear tooth pulse.

10 Claims, 4 Drawing Sheets

DETECTING A RELATIVE SHAFT POSITION ON GEARED SHAFTS

STATEMENT OF FEDERAL SUPPORT

This invention was developed with Government support under Grant # N00019-02-C-3003. awarded by the Department of the Air Force. The Government has certain rights in this invention.

BACKGROUND OF THE INVENTION

The present disclosure relates to detecting a relative position of a secondary gear. In particular, the present disclosure relates to determining the relative position of a secondary gear based on a detected relative position of a primary gear.

The position of a gear may be determined by affixing a phonic wheel to the gear. The phonic wheel includes teeth which are detected by a sensor, and the position of the phonic wheel is detected by detecting the teeth of the phonic wheel. Example sensors include magnetic speed pickup sensors, optic sensors, hall-effect sensors, and eddy-current sensors. However, when one or more gears are rotatably connected to the primary gear, it may be unfeasible to provide a phonic wheel or other sensor to detect a position of the secondary gear or gears.

BRIEF DESCRIPTION OF THE INVENTION

Embodiments of the present disclosure include a system having a gear assembly including a phonic wheel fixed to a primary gear and a secondary gear rotatably engaged to the first gear; a sensor configured to output a signal upon detecting a tooth of the phonic wheel; and a digital logic circuit configured to detect a revolution of the phonic wheel. The digital logic circuit generates a primary gear tooth pulse at intervals corresponding to intervals of teeth of the primary gear based on the detected revolution of the phonic wheel. The digital logic circuit also generates a secondary gear revolution signal at an interval corresponding to a revolution of the secondary gear based on the primary gear tooth pulse.

Embodiments of the present disclosure further include a digital logic circuit having a primary gear revolution counter configured to detect an input signal corresponding to teeth of a phonic wheel with a same rotation rate as a primary gear and to output a primary gear revolution signal upon detecting X teeth of the phonic wheel. The X teeth is a total number of teeth of the phonic wheel. Also, a primary gear tooth pulse generator is configured to receive the primary gear revolution signal and to generate a primary gear tooth pulse at a first interval of time corresponding to an interval of time at which a tooth of the primary gear passes a predetermined location. Further, a secondary gear revolution pulse generator is configured to generate a secondary gear revolution signal upon detecting Z primary gear tooth pulses, where Z corresponds to a total number of teeth of a secondary gear.

Embodiments of the present disclosure further include a method including detecting position signals corresponding to teeth of a phonic wheel, the phonic wheel fixed with respect to a primary gear, the primary gear rotatably engaged to a secondary gear; generating a primary gear revolution signal corresponding to a full revolution of the primary gear based on the detected position signals; generating primary/secondary gear tooth pulses corresponding to time intervals at which teeth of the primary and secondary gears pass a predetermined location based on the primary gear revolution signal; and generating a secondary gear revolution signal corresponding to a time interval at which the secondary gear completes a full revolution based on the primary/secondary gear tooth pulses.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
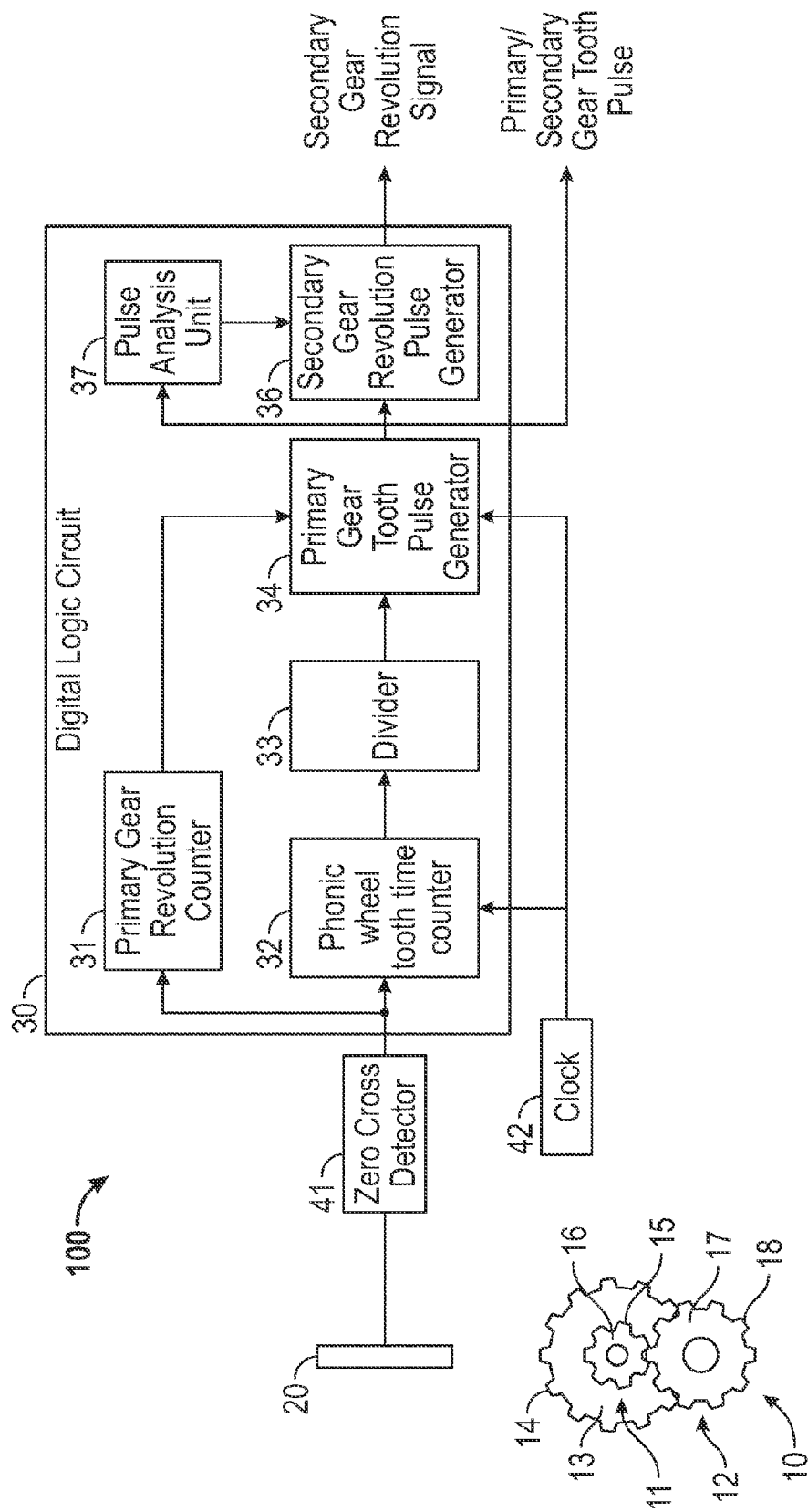
FIG. 1 illustrates a secondary shaft position detection system according to one embodiment of the present disclosure.

FIG. 1 illustrates a secondary shaft position detection system 100 according to an embodiment of the present invention. The system 100 includes a gear system 10 including a primary gear 11 and a secondary gear 12. The primary gear 11 is connected to a phonic wheel 13 and is in a fixed position relative to the phonic wheel 13. In other words, the rotation of the primary gear 11 causes the phonic wheel 13 to rotate at a same rate as the primary gear 11 and is co-axial with the primary gear 11. The primary gear includes a shaft 16 and a first number of teeth 15 around an outer perimeter of the shaft 16. The secondary gear 12 includes a shaft 17 and a second number of teeth 18 around an outer perimeter of the shaft 17. In embodiments of the present disclosure, the number of teeth 15 of the primary gear 11 is different than the number of teeth 18 of the secondary gear 12, and the primary gear 11 rotates at a different rate than the secondary gear 12.

In addition, the phonic wheel 13 includes a third number of teeth 14 around an outer perimeter of the phonic wheel 13. In embodiments of the present disclosure, each of the first number of teeth 15, the second number of teeth 18, and the third number of teeth 14 is different from each other. In one embodiment, a ratio between the first number of teeth 15 and the second number of teeth 18 is a non-whole number, such as 1:1.25, 1:1.5, 1:1.6, etc. The teeth 18 of the secondary gear 12 are configured to interlock with the teeth 15 of the primary gear 11, such that rotating one of the primary and secondary gears 11 and 12 causes the other of the primary and secondary gears 11 and 12 to rotate.

The system 100 includes a pickup probe 20 configured to generate an electrical signal, such as a sine wave, based on detecting the teeth 14 of the phonic wheel 13. A zero cross detector 41 detects inflection points of the signal generated by the pickup probe 20 corresponding to the detection of teeth 14 of the phonic wheel 13. For example, the zero cross detector 41 may detect points at which a sine wave generated by the pickup probe 20 crosses between a positive voltage and a negative voltage, and may output a high voltage when the sine wave is positive and a low voltage when the sine wave is negative. In other words, the zero cross detector 41 may convert the sine wave to a square wave.

The system 100 may further include a digital logic circuit 30 to receive as an input the square wave generated by the zero cross detector 41 and a clock signal from a clock 42. The digital logic circuit 30 receives the square wave and the clock signal and outputs a signal corresponding to each revolution of the secondary gear 12 and a signal corresponding to each tooth of the primary gear 11 and the secondary gear 12. In other words, the position of the secondary gear 12 is determined without direct measurement of the secondary gear 12 by a sensor, such as a phonic wheel 13. Instead, a position of the secondary gear 12 is determined based on a detected position of the primary gear 11.

The digital logic circuit 30 may include a phonic wheel tooth time counter 32 configured to determine a period of time, t1, in which N teeth 14 of the phonic wheel 13 are detected by the pickup probe 20. In embodiments of the present invention, N is a number greater than 1, and in one embodiment, N corresponds to a total number of teeth 14 on the phonic wheel 13. In other words, in one embodiment, the phonic wheel tooth time counter 32 may detect a period of time t1 in which the phonic wheel 13 rotates one full revolution. In one embodiment, the phonic wheel tooth time counter 32 detects the period of time t1 for the N teeth to be detected by the pickup probe 20 each time a tooth 14 is detected by the pickup probe 20. In other words, in an embodiment in which the phonic wheel 13 includes twenty teeth, numbered 14a-14t, and the teeth are detected in ascending alphabetic order, the phonic wheel tooth time counter 32 may detect a first time period corresponding to the passage of teeth 14a-14t, a next time period corresponding to the passage of teeth beginning with tooth 14b. and ending with tooth 14a, a next time period corresponding to the passage of teeth beginning with tooth 14c. and ending with tooth 14b, etc.

In one embodiment, the phonic wheel tooth time counter 32 outputs the detected period of time t1 to a divider 33 that is configured to divide the time period t1 by a number (X/N)*Y where N is a predetermined number of teeth 14 greater than one and less than or equal to the total number of teeth 14 of the phonic wheel 13, X corresponds to the total number of teeth 14 on the phonic wheel 13, and Y corresponds to the total number of teeth 15 on the primary gear 11. When N is selected to equal the total number of teeth 14 on the phonic wheel 13 then the divider 33 is configured to divide the time period t1 by Y corresponding to a total number of teeth 15 of the primary gear 11. Since the phonic wheel 13 and the primary gear 11 rotate at a same rate, one revolution time period of the phonic wheel 13 detected by the phonic wheel tooth time counter 32 is the same as one revolution time period of the primary gear 11. Accordingly, the divider 33 divides the detected time period t1 by the number of teeth 15 of the primary gear 11 and outputs a time period t2 corresponding to a time period for each tooth 15 of the primary gear 11 to pass a same predetermined point. For example, in an embodiment in which the time period t1 is 1. ms and the primary gear 11 includes twenty teeth, the divider 33 would divide the time period t1 by twenty and output a time period t2 corresponding to 1/20 ms.

A primary gear tooth pulse generator 34 receives the time period t2 from the divider 33 and generates Y pulses spaced apart by the time period t2. In particular, a pulse spacing value v1 may be set to be equal to the time period t2, and the primary gear tooth pulse generator 34 may generate pulses at intervals corresponding to the pulse spacing value v1. A primary gear revolution counter 31 analyzes the square wave output by the zero cross detector 41 and counts X zero-crosses. Upon counting X zero-crosses, the primary gear revolution counter 31 outputs a signal r1 to cause the primary gear tooth pulse generator 34 to reset the pulse spacing value v1 to correspond to a presently detected time period t2. Although the time period t2 may be calculated after each zero-cross of the zero cross detector 41, the time period t2 output by the divider 33 may be stored as the pulse spacing value v1 only upon detecting the signal r1 from the primary shaft revolution counter 31.

The digital logic circuit 30 may further include a secondary gear revolution pulse generator 36 configured to count Z pulses from the primary gear tooth pulse generator 34, where Z is the number of teeth 18 of the secondary gear 12. In other words, a position of the secondary gear 12 is determined based on digital logic of the digital logic circuit 30 even when the rotation of the secondary gear 12 is not measured directly by a sensor, such as the pickup probe 20.

In one embodiment of the present disclosure, the digital logic circuit 30 includes a pulse analysis unit 37 to receive an input pulse and to analyze the pulse to calculate an error, a skipped signal, noise, or other characteristics of the pulse, or of the line including the pulse. For example, the pulse analysis unit 37 illustrated in FIG. 1 may receive as an input signal a pulse from the primary gear tooth pulse generator 34, may detect a time period t3 between the presently detected pulse and a previously detected pulse, may compare the time period t3 to a previous time period, and may determine whether an extra pulse has been detected, or whether a pulse was skipped, by comparing the time period t3 to the previous time period. If it is determined that an extra pulse has been detected, or that a pulse has been skipped, the pulse analysis unit 37 may generate a signal to adjust the counter value of the secondary gear revolution pulse generator 36 to either decrement the counter value or increment the counter value.

Although FIG. 1 illustrates a pulse analysis unit 37 that receives as an input the pulse generated by the primary gear tooth pulse generator 34, the pulse analysis unit 37 may receive inputs from the primary gear revolution counter 31, the phonic wheel tooth time counter 32, or the zero cross detector 41, for example. In one embodiment, the digital logic circuit 30 includes multiple pulse analysis units to analyze outputs of multiple pulse generators or counters of the digital logic circuit 30.

While FIG. 1 illustrates a digital logic circuit 30 that generates a primary/secondary gear tooth pulse based on each of a time period from one tooth 15 of the primary gear 11 to the next and on a reset signal output from a primary gear revolution counter 31, in one embodiment of the present disclosure, the phonic wheel tooth time counter 32 and divider 33 may be omitted, and the primary gear tooth pulse generator 34 may generate a primary/secondary gear tooth pulse signal based only on the output of the primary gear revolution counter 31.

In another embodiment, the primary gear tooth pulse generator 34 may include a comparator to compare a present rotation rate to a previous rotation rate. The primary gear tooth pulse tooth generator 34 may then calculate a rate of change of rotation rate and generate an output pulse signal based on a rotation rate extrapolated from the calculated rate of change of the rotation rate.

In yet another embodiment, the digital logic circuit 30 may include a correction calculation unit, or the primary gear tooth pulse generator 34 may be configured to further provide a correction signal based on a rate of change of time output from the phonic wheel tooth time counter 32 and/or the divider 33.

Figure 2A:
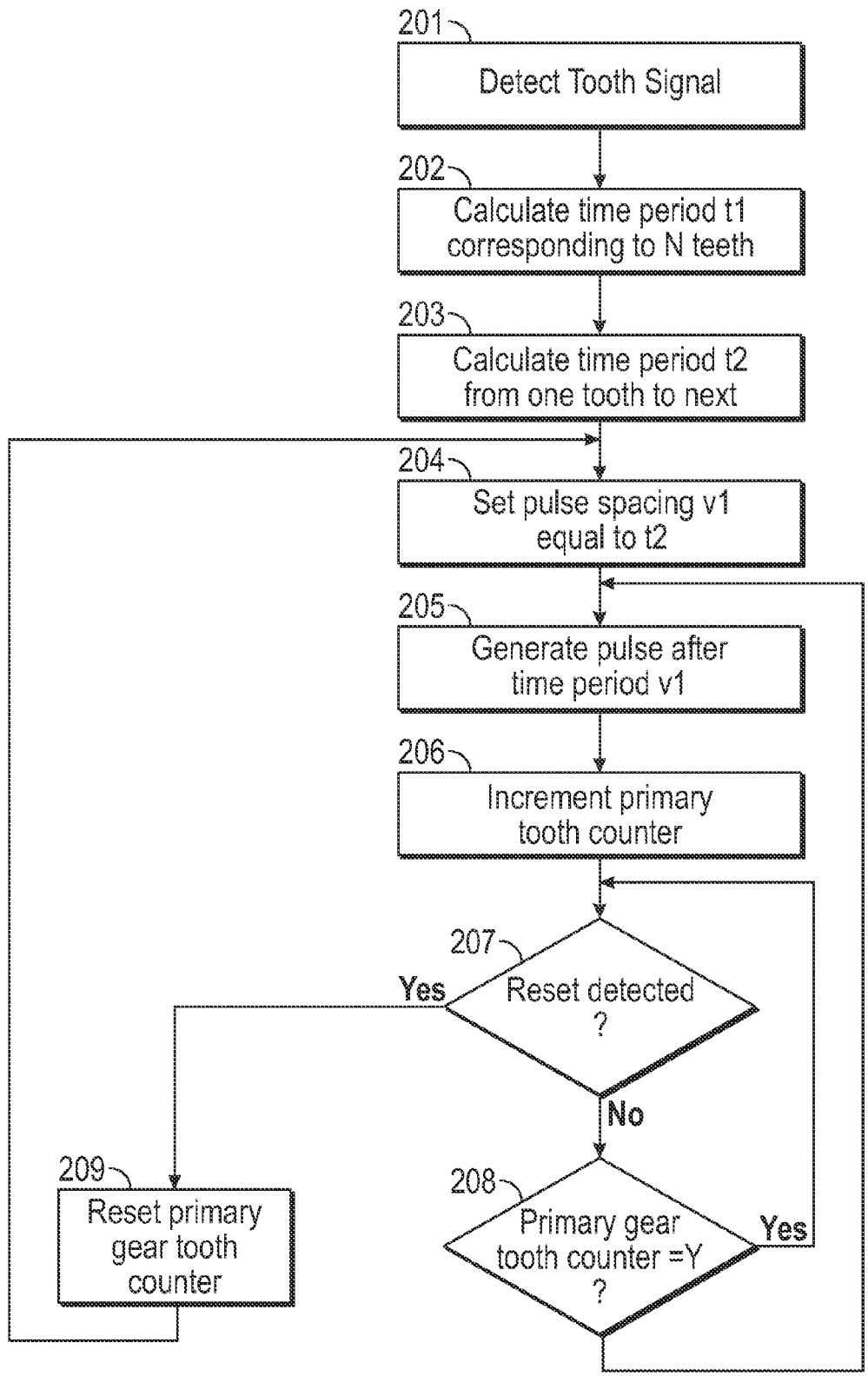
FIGS. 2A and 2B are flow charts of a process for generating tooth signals according to embodiments of the present disclosure.

FIG. 2A is a flowchart illustrating a process according to one embodiment of the present disclosure. In operation 201, a signal is detected corresponding to teeth 14 of a phonic wheel 13. For example, the pickup probe 20 may generate a signal based on teeth 14 of the phonic wheel 13, and the zero cross detector 41 may convert the generated signal into a square wave signal which may be detected by a phonic wheel tooth time counter 32. In operation 202, a time period t1 is calculated between portions of the signal corresponding to N teeth 14 of the phonic wheel 13. In one embodiment, N corresponds to a number of teeth 14 of the phonic wheel 13, such that the period of time t1 corresponds to a time for one revolution of the phonic wheel 13. In an embodiment in which the signal is a sine wave and a negative-to-positive zero cross corresponds to a front edge of a tooth 14 crossing the pickup probe 20, the time period t1 may correspond to the period of time in which N negative-to-positive zero cross transitions are detected.

In operation 203, a time period t2 is calculated corresponding to time duration from one tooth 15 of the primary gear 11 to a next tooth 15 of the primary gear 11. In one embodiment, the divider 33 divides the time period t1 by a number (X/N)*Y where N is a predetermined number of teeth 14 greater than one and less than or equal to the total number of teeth 14 of the phonic wheel 13, X corresponds to the total number of teeth 14 on the phonic wheel 13, and Y corresponds to the total number of teeth 15 on the primary gear 11. In operation 204, a pulse spacing value v1 is set, and a pulse is generated in operation 205 after the duration corresponding to the pulse spacing value v1. In one embodiment, the pulse spacing value v1 is set in a memory location or register of the digital logic circuit 30, such as in a memory or register of the primary gear tooth pulse generator 34. In operation 206, a primary gear tooth counter is incremented, and in operation 207, it is determined whether a reset signal is detected. For example, the primary gear revolution counter 31 may count X number of zero cross points as indicated by the square wave output from the zero cross detector 41 and may output a reset signal when X number of zero cross points are detected.

If it is determined in operation 207 that a reset is detected, then in operation 209, the primary gear tooth counter is reset in operation 209, then the process returns to operation 204 in which a presently calculated time t2 is stored as the pulse spacing value v1. On the other hand, if it is determined in operation 207 that a reset is not detected, then it may be determined in operation 208, whether the primary gear tooth counter equals Y, corresponding to a number of teeth 15 of the primary gear 11. If it is determined in operation 208 that the counter value is less than the value Y, then the process returns to operation 205, and a next pulse is generated in operation 205. On the other hand, if the counter value equals Y, then the process returns to operation 207 and a next pulse is not generated until the reset is detected.

Figure 2B:
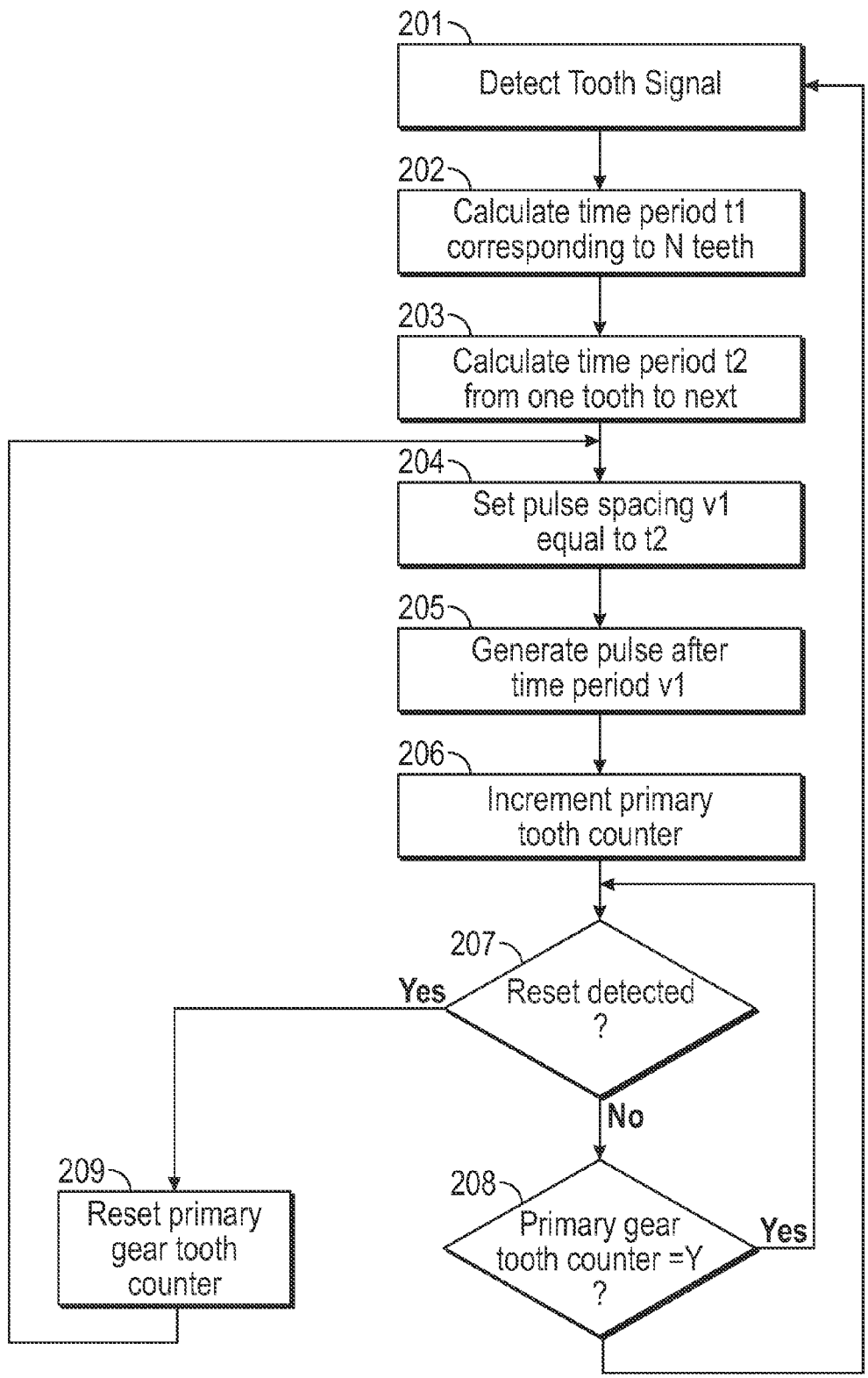

FIG. 2B is a flowchart illustrating a method according to another embodiment. The blocks 201-209 of FIG. 2B are the same as FIG. 2A, and a description of blocks 201-209 has been provided above with respect to FIG. 2A. However, as illustrated in FIG. 2B, in one embodiment when it is determined in operation 208 that the primary gear tooth counter=Y, the operations 201-204 are repeated, such that the pulse spacing value v1 is updated with each tooth detection of operation 201.

Figure 3:
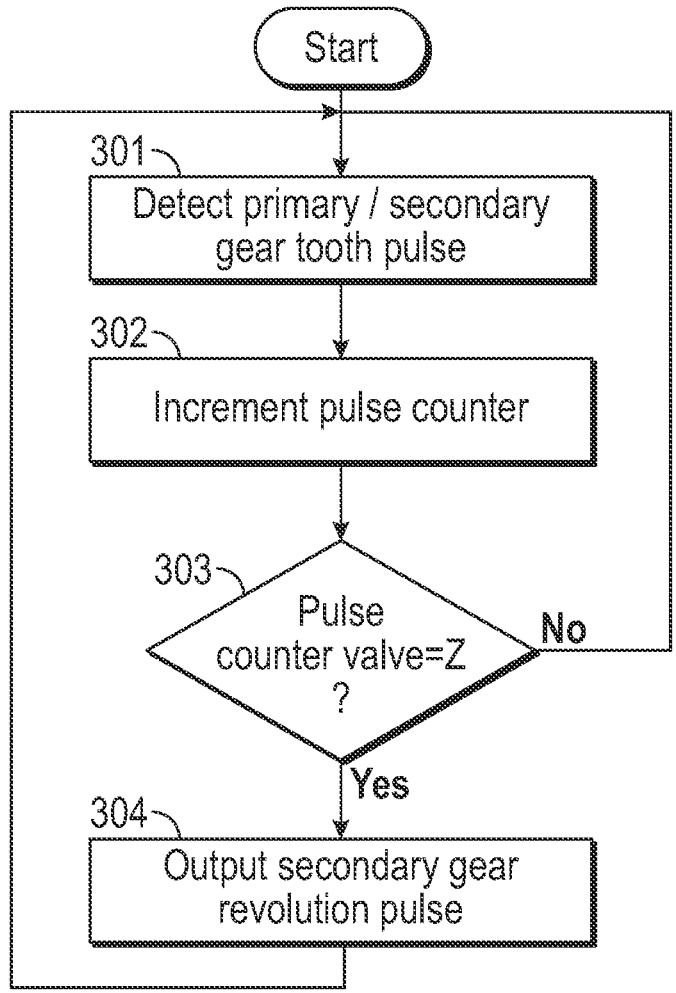
FIG. 3 is a flow chart of a process for generating position signals of a secondary shaft according to one embodiment of the present disclosure.

FIG. 3 is a flow diagram illustrating a process for generating a secondary gear revolution signal according to an embodiment of the present disclosure. In operation 301, a primary/secondary gear tooth pulse is detected. The primary/secondary gear tooth pulse may correspond to the pulse generated in operation 205 of FIG. 2. In operation 302, a pulse counter is incremented, and in operation 303, the pulse counter value is compared to a value Z, corresponding to a number of teeth 18 of the secondary gear 12.

If it is determined in operation 303 that the pulse counter value equals Z, then a secondary gear revolution pulse is output in operation 304. In one embodiment, the secondary gear revolution pulse generator 36 receives as an input the primary/secondary gear tooth pulse, counts the pulses and compares a counter value to the number Z, and outputs the secondary gear revolution pulse. On the other hand, if it is determined in operation 303 that the pulse counter value does not equal Z, then the process returns to operation 301 to detect a next pulse signal.

According to the above-described embodiments, position signals corresponding to a position of a first wheel provide information about a position of a first gear, and the information regarding the position of the first gear is used to determine a relative position of a second gear that rotates based on the rotation of the first gear. While the above embodiments describe only a primary and a secondary gear, additional gears having known numbers of teeth that rotate based on a rotation of the primary gear may have position information calculated based on the position of the primary gear.

In the above described embodiments, position information of the secondary gear is calculated based on integral tooth information of the primary gear or the phonic wheel. In other words, the relative position of the primary gear may be calculated based on rotation information of a plurality of teeth of the phonic wheel, up to all of the teeth of the phonic wheel, and errors due to mechanical variations between teeth of the phonic wheel may be reduced or eliminated. In addition, since a rotation rate based on a revolution of the phonic wheel may be calculated at each detection of a next tooth or plurality of teeth of the phonic wheel, latency errors due to shaft speed variations may be reduced or eliminated. In addition, by resetting a primary gear revolution pulse generator at each revolution of the phonic wheel, errors due to shaft speed variation may be reduced or eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system, comprising:
 a gear assembly including a phonic wheel fixed to a primary gear and a secondary gear rotatably engaged to the primary gear;
 a sensor configured to output a signal upon detecting a tooth of the phonic wheel; and
 a digital logic circuit configured to detect the signal, to generate a primary gear tooth pulse at intervals corresponding to intervals of teeth of the primary gear based on the detected signal, and to generate a secondary gear revolution signal at an interval corresponding to a revolution of the secondary gear based on the primary gear tooth pulse;
 wherein the digital logic circuit includes a phonic wheel tooth time counter to count the N teeth of the phonic wheel detected by the sensor and to calculate a first time period for detecting the N teeth;
 wherein the N teeth is a number of total teeth located around a circumference of the phonic wheel; and
 wherein the digital logic circuit includes a divider configured to receive from the phonic wheel tooth time counter the first time period for detecting the N number of teeth and to divide the first time period by Y to generate a second time period, where Y corresponds to a total number of teeth located around an outer circumference of the primary gear.

2. The system of claim 1, wherein the digital logic circuit includes a primary gear revolution counter configured to output a primary gear revolution signal upon counting N teeth of the phonic wheel based on output signals from the sensor corresponding to the teeth of the phonic wheel, where N is a number greater than one and less than-or-equal-to a total number of teeth located around a circumference of the phonic wheel.

3. The system of claim 1, wherein the digital logic circuit includes a primary gear revolution counter configured to output a primary gear revolution signal upon counting N output signals from the sensor corresponding to the N teeth of the phonic wheel, where N is a number of total teeth located around a circumference of the phonic wheel, and the digital logic includes a primary gear tooth pulse generator configured to receive the primary gear revolution signal and the second time period, and to output a primary/secondary gear tooth pulse corresponding to intervals at which teeth of the primary and secondary gears rotate past a predetermined location, the primary/secondary gear tooth pulse based on the primary gear revolution signal and the second time period.

4. The system of claim 3, wherein the digital logic circuit includes a secondary gear revolution pulse generator configured to count Z pulses of the primary/secondary gear tooth pulse, where Z is a total number of teeth located around a circumference of the second gear, and to output a secondary gear revolution signal at an interval corresponding to a third time period in which the secondary gear makes one revolution.

5. The system of claim 3, wherein the primary gear tooth pulse generator is configured to generate a first set of Y pulses and to await detection of the primary gear revolution signal prior to generating a next set of Y pulses.

6. A digital logic circuit, comprising:
a primary gear revolution counter configured to detect an input signal corresponding to teeth of a phonic wheel having a same rotation rate as a primary gear and to output a primary gear revolution signal upon detecting N teeth of the phonic wheel, where N is a number of teeth of the phonic wheel greater than one and less-than-or-equal-to a total number of teeth of the phonic wheel;
a primary gear tooth pulse generator configured to receive the primary gear revolution signal and to generate a primary gear tooth pulse at a first interval of time corresponding to an interval of time at which a tooth of the primary gear passes a predetermined location;
a secondary gear revolution pulse generator configured to generate a secondary gear revolution signal upon detecting Z primary gear tooth pulses, wherein Z corresponds to a total number of teeth of a secondary gear;
a phonic wheel tooth time counter configured to detect a first time period over which the N teeth are detected; and
a divider configured to divide the first time period by (X/N)*Y to generate a second time period, wherein X corresponds to a total number of teeth of the phonic wheel and Y corresponds to a total number of teeth of the primary gear,
wherein the primary gear tooth pulse generator generates the primary gear tooth pulse based on the primary gear revolution signal and the second time period.

7. The digital logic circuit of claim 6, wherein the primary gear tooth pulse generator is configured to generate a plurality of primary gear tooth pulses spaced apart by the second time period until at least one of the primary gear revolution signal is detected or Y primary gear tooth pulses are generated.

8. The digital logic circuit of claim 6, wherein the generated primary gear tooth pulses are stored as a pulse spacing value based on a presently detected second time period upon detecting the primary gear revolution signal.

9. The digital logic circuit of claim 6, further comprising a pulse analysis unit configured to detect at least one of a missing pulse and an extra pulse based on at least one of the primary gear tooth pulse and the secondary gear revolution signal.

10. The digital logic circuit of claim 6, wherein the primary gear tooth pulse generator is configured to generate the primary gear tooth pulse based at least upon a calculated difference in a time period between two different pairs of teeth of the phonic wheel.

* * * * *